United States Patent [19]
Pabst

[11] Patent Number: 4,648,971
[45] Date of Patent: Mar. 10, 1987

[54] FLOW THROUGH FILTER WITH BACKFLUSH CLEARING CAPABILITY

[76] Inventor: Richard E. Pabst, 1715 Target Ct., Houston, Tex. 77043

[21] Appl. No.: 807,506

[22] Filed: Dec. 11, 1985

Related U.S. Application Data

[63] Continuation-in-part of Ser. No. 680,399, Dec. 11, 1984, Pat. No. 4,592,848.

[51] Int. Cl.[4] .............................................. B01D 29/38
[52] U.S. Cl. .................................... 210/354; 210/412; 210/423; 210/426
[58] Field of Search ............. 210/108, 354, 356, 408, 210/411, 412, 423, 426, 497.01, 797, 798

[56] References Cited

U.S. PATENT DOCUMENTS

| | | | |
|---|---|---|---|
| 718,358 | 1/1903 | Kneuper | 210/356 |
| 3,206,178 | 9/1965 | Lamb | 210/497.01 X |
| 3,276,594 | 10/1966 | Gwilliam | 210/411 X |
| 3,535,852 | 10/1970 | Hirs | 55/302 |
| 3,540,193 | 11/1970 | Pausch | 55/273 |
| 3,542,195 | 11/1970 | Soriente | 210/108 |
| 3,542,198 | 11/1970 | Borjeson | 210/111 |
| 3,556,302 | 1/1971 | Agranat | 210/356 X |
| 3,579,422 | 5/1971 | Minick et al. | 210/402 X |
| 3,581,893 | 6/1971 | Rich | 210/412 X |
| 3,598,238 | 8/1971 | Collins, Jr. | 210/138 |
| 3,631,981 | 1/1972 | Young | 210/497.01 X |
| 3,637,079 | 1/1972 | Strub | 210/356 X |
| 3,675,775 | 7/1972 | Obidniak | 210/138 |
| 3,692,178 | 9/1972 | Reece | 210/798 |
| 3,834,535 | 9/1974 | Portyrata | 210/356 X |
| 3,850,803 | 11/1974 | Adams | 210/142 |
| 3,862,036 | 1/1975 | Simmons | 210/412 X |
| 3,891,551 | 6/1975 | Tiedemann | 210/410 X |
| 3,907,686 | 9/1975 | Fletcher et al. | 210/259 |
| 3,994,810 | 11/1976 | Schaeffer | 210/103 |
| 4,029,579 | 6/1977 | Jacobsen et al. | 210/798 |
| 4,082,665 | 4/1978 | Schneider et al. | 210/91 |
| 4,210,538 | 7/1980 | Tantilio et al. | 210/426 X |
| 4,411,792 | 10/1983 | Babb | 210/411 X |

FOREIGN PATENT DOCUMENTS 1276086 10/1961 France .................... 210/412

OTHER PUBLICATIONS

NASA, "Self-Cleaning Tubular-Membrane Module", NASA Tech Brief, vol. 7, No. 3, M. N. Sarbolouki (Spring 1983), 2 pages.
Norton "Ceraflo" Ceramic Microfilter Brochure (1984), 6 pages.
Osmonics, Inc. Brochure on "OSMO Sepralator", 2 pages, (P/N 16730).
Mott Metallurgical Corp. "Application and Product News" (1984), Form 1005, 4 pages.

*Primary Examiner*—Robert Spitzer
*Attorney, Agent, or Firm*—Patrea L. Pabst

[57] ABSTRACT

A filter consisting of a housing, a rigid, porous filtering element, means for forming a primary filter path along the filtering element, and a non-rigid expanding element, wherein when a solution to be filtered flows through the primary flow path, filtrate passes through the rigid filtering element and particulate matter is retained on or in the filtering element. When the filter surface becomes clogged, the incoming solution is bypassed, reduced, or discontinued and the non-rigid expanding element expanded to first form discrete compartments of filtrate between the expanding element and the filtering element and secondly to force the discrete volumes of filtrate back through the filtering element into the flow path for removal. In one embodiment, the housing and filtering element consist of hollow cylinders and the expanding element extends lengthwise through the interior of the filtering element, expanding outwardly to expel particulate matter. In another embodiment, the housing and filtering element also consist of hollow cylinders but the expanding element surrounds the filtering element and is pressed inwardly against the filtering element surface by pressure exerted between the housing and the filtering element. Both embodiments provide rapid, uniform clearing of the filtering element.

12 Claims, 6 Drawing Figures

FIGURE 3
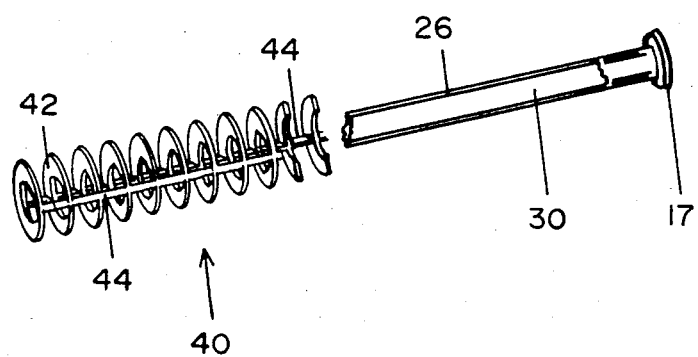
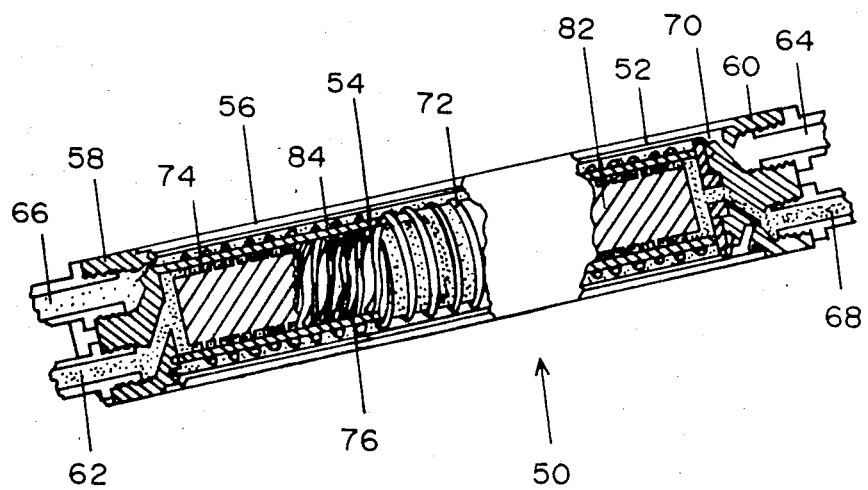
FIGURE 4

FIGURE 5A
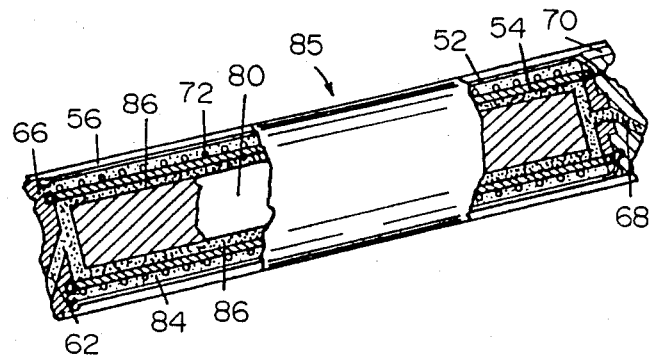
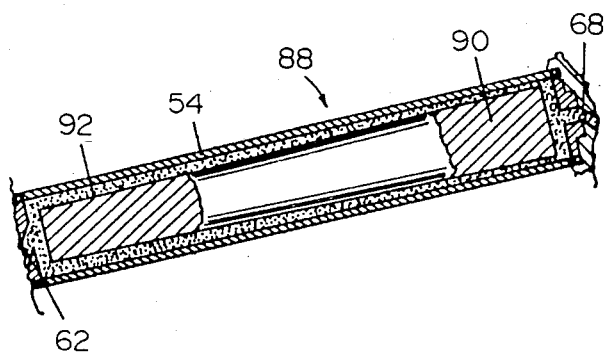
FIGURE 5B

FLOW THROUGH FILTER WITH BACKFLUSH CLEARING CAPABILITY

BACKGROUND OF THE INVENTION

This application is a continuation-in-part of U.S. Ser. No. 680,399 filed Dec. 11, 1984 issued June 3, 1986 as U.S. Pat. No. 4,592,848 entitled "Flow Through Filter with Backflush Clearing Capability".

The filter disclosed in U.S. Ser. No. 680,399 consists of a cylindrical housing which envelopes a cylindrical porous filter element containing an expander element extending lengthwise through the filter element. A helical flow path along the outside of the filter element conducts the solution to be filtered over the surface of the filtering element and particulate matter is trapped by the filter material. When enough material is trapped by the filter that the pressure drop through the filter rises above a certain level, a backflush cycle is initiated. Several modes are possible with regard to whether or not the flow of solution to be filtered is stopped or allowed to continue to flow, either through a bypass in the filter or through means exterior to the filter.

The unique feature of the backflush is the interaction of the expander element with the cylindrical filter element such that discrete volumes of filtrate are formed between the expander element and the interior of the filtering element. The volumes are contained by discrete annular ridges extending along the length of the filter element, formed as a part of the expander element, as a part of the filtering element, or as an "interposing" structure. As with the helical flow path on the exterior of the filtering element, construction of annular ridges is determined by the material making up the filter element and the expander tube, the pressures present in the particular filtering system, and the nature of the material being filtered.

The advantage of the disclosed backflush is that the expander tube pushes the filtrate back through the filter material uniformly, not through the areas of least resistance, as would be the case with a conventional expander or backflush system. The filtered material which is removed from the filter element is swept away by turbulent flow through the primary flow path, either for collection at another point in the system or for discard.

In the embodiments disclosed in U.S. Ser. No. 680,399, the material to be filtered enters the primary flow path on the exterior of the filter element and the expander element expands outwardly to force filtrate from the inside to the outside of the filtering element. One disadvantage to method is that the expander tube may on occassion rupture due to the applied stress.

It is therefore an object of the present invention to provide a filtering apparatus with a backflush which clears the filtering element using an accurately controlled and metered volume of uniformly distributed flow from the outside of the filter element inwardly, with less stress on the expanding element.

It is another object of the present invention to provide a simple, inexpensively manufactured filter with low long-term maintenance.

It is a further object of the invention to provide a filtering apparatus which is useful with a variety of filtering materials, including asymmetric ceramic materials and stainless steel mesh.

SUMMARY OF THE INVENTION

A filter consisting of a cylindrical housing, a cylindrical filtering element, an expander element which extends along the length of the filtering element, a primary flow path running from one end of the filtering element to the other, and structure for forming discrete annular compartments along the length of the filtering element opposite the primary flow path when pressure is applied to the expander element.

In operation, a solution to be filtered flows through the primary flow path and the filtrate passes through the rigid filter element and out of the filter. The particulate matter is retained on or in the filter element material. When the rigid filter surface becomes clogged, the incoming solution is bypassed, reduced, or discontinued, and pressure applied to the non-rigid expanding element, forcing it against the surface of the filter element opposite the primary flow path. As the expanding element presses against the filter element surface, it forms discrete annular compartments along the length of the filtering element, closing off discrete, equal volumes of filtrate. As further pressure is applied to the expanding element, the expanding element collapses into the discrete compartments, forcing the trapped filtrate back through the filter element material and clearing the filter element of the trapped particulate matter. The particulate matter is then removed from the primary flow path by a clearing solution or recirculated in the solution to be filtered.

There are two basic embodiments of the filtering apparatus: one wherein the filtrate passes from a primary flow path along the exterior surface of the filter element, through the filter element material, and out from the center of the filter element, and one wherein the filtrate passes from the interior of the filter element, through the filter material, and out through a flow path along the exterior of the filter element. In the first embodiment, the expanding element extends along the interior surface of the filtering element. In the second embodiment, the expanding element extends along and surrounds the exterior of the filtering element. The flow characteristics can vary widely between the two embodiments, depending on the solution to be filtered and the composition of the filter element. For example, fluid flow rates through an asymmetric ceramic material with a pore size which decreases from the outside to the inside when the material is in tubular or cylindrical form would be quite different in the two filters. The shear characteristics would also be different for the two embodiments. The primary advantage to the second embodiment is the decreased strain on the non-rigid expanding element when it surrounds the filtering element and is compressed against the surface of the filtering element by pressure between the housing and the expanding element than in the first embodiment wherein the pressure is exerted within the expanding element to force it outwardly against the filtering element.

The filter as disclosed may be used in a single housing-valve arrangement or in a larger housing which contains multiple filtering elements-expanding elements, as long as each filtering element has a separate filter path-expanding element-structure for forming discrete compartments between the expanding element and the filtering element.

BRIEF DESCRIPTION OF THE DRAWINGS

FIG. 3 is a perspective view, partially in section, of a structure used to form the annular ridges between the expander tube of FIG. 1 and a smooth interior filtering element.

FIG. 4 is a perspective view, partially in section, of a filter with the expander tube surrounding the rigid porous filtering element.

FIG. 5A is a perspective view, partially in section, of another embodiment of the rigid guide means of the filter of FIG. 4.

FIG. 5B is a perspective view, partially in section, of a third embodiment of the rigid guide means of the filter of FIG. 4.

DETAILED DESCRIPTION OF THE INVENTION

Figure 1:
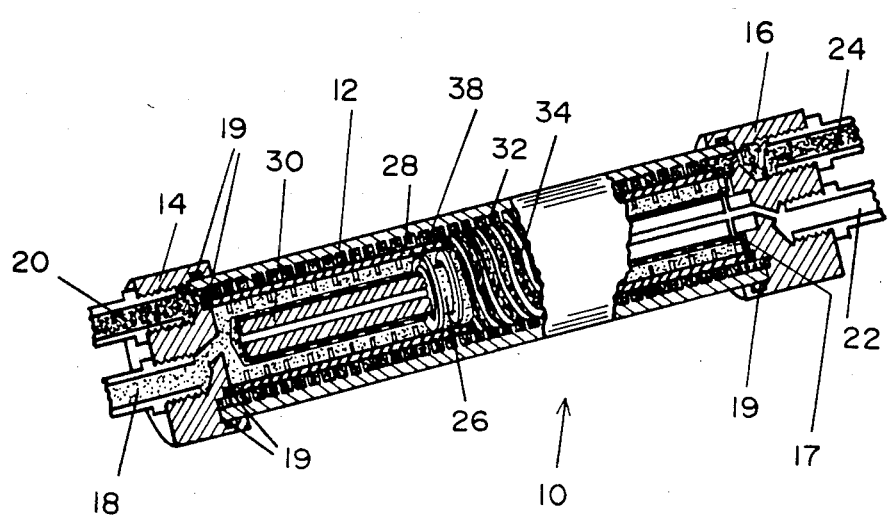
FIG. 1 is a perspective view, partially in section, of the filter with the expanding element along the inside of the filtering element.

As shown in FIG. 1, the embodiment 10 of the present invention consists of a cylindrical, hollow housing 12 with endpieces 14 and 16 containing an inlet 18 for the solution to be filtered, an outlet 20 for the filtrate, an outlet 22 for the retentate, and an inlet 24 for a pressure source to an expanding element 26, and a porous, rigid filtering element 28. The non-rigid expanding element 26 extends along the length of the rigid, porous filtering element 28 which is secured to the endpieces 14 and 16. The expanding element 26 is closed at one end and opens outwardly at end 17 for connection to pressure source 24. Both the expanding element endpieces and the filtering element 28 are sealed by o-rings 19 to the endpieces 14 and 16. An optional guide or support piece 30 extends along the interior length of the expanding element 26. A helical structure 32 is located between the interior of the housing 12 to form a helical flow path 34 for the solution to be filtered. In the embodiment 10 shown, the helical flow path 34 is formed as a part of the interior surface of the housing 12. The structure 32 can also be formed as a separate helical structure which is inserted into the filter between the housing 12 and the exterior surface of the filtering element 28. One or more helical flow paths 34 can be located along the length of the filtering element 28. Alternatively, the helical flow path 34 may be formed by carving or molding a helical projection 32 along the exterior surface of the filtering element 28. A smooth flow path may also be used in some embodiments where it is desired to reduce shear or turbulent flow.

The filtering element 28 consists of a porous material, for example, stainless steel or a ceramic material such as the asymmetric ceramic filter material produced by the Norton Company, Worcester, MA or the filter material made by the Minnesota Mining and Manufacturing Company, MN, of spherical glass beads bonded together with an epoxy compound. The non-rigid expanding element 26 is made of rubber or an elastomer compound such as Silastic TM (Dow-Corning) or Viton TM (Dupont Chemical Co.).

Figure 2:
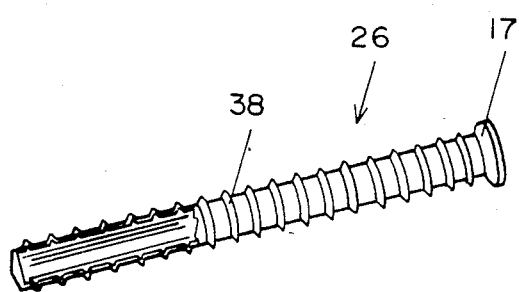
FIG. 2 is a perspective view, partially in section, of an expanding element with molded annular ridges.

The expanding element 26 expands outwardly to contact discrete annular ridges 38 between the filtering element 28 and the expanding element 26. The elements 38 can be formed as a part of the expanding element 26 at the time it is molded, as shown in FIG. 2, formed as a part of the filtering element 28 as it is manufactured, or made as a separate structure, such as the structure 40 shown in FIG. 3. The structure 40 is formed from a series of discrete ring pieces 42 spaced axially to form annular compartments of a desired size which are maintained in position by integral axial ribs 44. In the preferred embodiment 40, two ribs are spaced 180° apart and have a maximum width equal to the difference between the outer diameter and the inner diameter of the ring pieces 42. The discrete ring pieces 42 are sized to fit snugly against the interior surface of the filtering element 28. The structure 40 can be made of a plastic, a metal such as brass, aluminum, or stainless steel, or even molded from a ceramic material.

A pressure source 24 supplies pressure, either as a gas or in liquid form, to the interior of the expanding element 26. The pressure source 24 is controlled so that backflushing or clearing of the filtering element 28 occurs only after a certain amount of particulate matter has built up on and in the filtering element 26. This may be determined by measuring the change in pressure drop through the filter or by decreased flow rate. When the pressure source 24 is to be connected to the expanding element 26, the solution to be filtered is stopped, reduced, bypassed, or allowed to continue to flow through the filter path 34, depending on the nature of the solution to be filtered and whether it is desirable to remove the accumulated particulate matter or to maintain constant flow with increasing concentration of retentate over time.

As the expanding element 26 first contacts the annular ridges 38, discrete volumes of filtrate are formed between the filtering element 28 and the expanding element 26. As the expanding element 26 continues to expand, these discrete volumes of filtrate are forced back through the filter material, thereby uniformly removing trapped particulate matter from the pores and surface of the filtering element 28 into the primary flow path 34. Either the solution being filtered or a separate clearing solution can then be used to remove the particulate matter.

A second embodiment 50 of the present invention is shown in FIG. 4. In this embodiment 50, the expanding element 52 is located on the outside of the filtering element 54, both located inside of a cylindrical, hollow housing 56 with endpieces 58 and 60. As in the first embodiment 10, there is an inlet 62 for the solution to be filtered, an inlet 64 for a pressure source to the expanding element 52, an outlet 66 for the filtrate, and an outlet 68 for the retentate in the endpieces 58 and 60. The pressure source 64 supplies pressure to the space 70 between the housing 56 and the expanding element 52 so that the expanding element 52 is forced inward against discrete annular ridges 72 along the length of the filtering element 54 to form discrete, equal volumes of filtrate which are then uniformly forced back through the filtering element 54 into the primary flow path 74.

In the embodiment 50 shown in FIG. 4, the primary flow path 74 is formed on the inside of the filtering element 54 from one or more helical projections 76 adjacent the interior surface of the filtering element 54. As with the first embodiment 10, the helical projection 76 can be formed as an integral part of the filtering element 54, as a solid piece 82 with a helical path formed on the exterior surface, as shown in FIG. 4, or as a separate helical structure interposed between the filtering element 54 and a rigid guide piece such as the piece 80 and 90 shown in FIG. 5A or 5B. The solution to be filtered enters through inlet 62 directly into the primary flow path 74, filtrate passes through the filtering element 54 into the space 84, and into outlet 66. The retentate travels through the primary flow path 74 to outlet 68.

In a variation 85 of the rigid guide piece 82, an unrestricted flow path 86 is used instead of the helical flow path 74 in order to change the shear characteristics of the liquid along the surface of the filtering element 54. In the embodiment 85 shown in FIG. 5A, this is accomplished by using a rigid guide piece 80 without the helical projection 76. Shear is increased in the embodiment 88, shown in FIG. 5B, by using a tapered rigid guide piece 90 to create a smooth flow path 92 with a variable cross-sectional area. In theory, although the cross-sectional area of the flow path 92 decreases along the length of the filtering element 54 which would be expected to result in decreased velocity of the solution being filtered, the velocity actually remains constant since the solution volume is decreasing due to the passage of filtrate through the filtering element 54.

The described filtering apparatus may be used with a valve such as the one described in U.S. Ser. No. 680,399 filed Dec. 11, 1984 entitled "Flow Through Filter with Backflush Clearing Capability" as an independent filtering device. It may also be used as a replaceable filter unit in a system with pumping and valving designed to control a group of the filtering apparatus as a unit. This is useful to increase the combined flow rate and/or volume of liquid which can be filtered at any one time as well as providing an apparatus for continuous filtering. The individual units may be controlled to allow bypass of any one unit at a time, all of the units at a time, or some combination so that flow can continue uninterrupted while backflush/clearing of one or more units occurs. The units can be operated manually or by electronic solenoid valves.

The foregoing invention has been described with reference to its preferred embodiments and possible variations. Although other variations and modifications will occur to those skilled in the art, it is intended that such variations and modifications fall within the scope of the appended claims. Included would be non-cylindrically shaped filtering elements and housing, wherein the crucial distinction is the interaction of an expanding element and the filtering element during a backflush/-clearing cycle to form discrete, annular compartments of filtrate which are forced back through the filtering element to uniformly remove trapped particulate matter.

I claim:

1. A reasable, flow-through filtering apparatus for removing particulate matter from a liquid solution comprising:
   inlet means through which the solution to be filtered enters a primary filter path through the apparatus;
   first outlet means through which filtrate exits said apparatus;
   second outlet means through which filtered particulate matter exits said apparatus;
   a filter body surrounding and housing a porous rigid filtering means, said filtering means allowing filtrate to pass through its pores and causing particulate matter to lodge on and within pores of said filtering means;
   non-rigid expanding means positioned adjacent said filtering means, said non-rigid expanding means when supplied with pressure from a pressure source expanding first so as to form discrete compartments along the length of the filter path of said filtering means and secondly so as to contact the surface of said filtering means;
   whereby when solution enters the filter through said inlet means the filtrate is separated from the particulate matter with the particulate matter being captured by said filtering means and
   whereby when a pressure source supplies pressure to said expanding means the particulate matter is uniformly forced from the pores and surface of said filtering means into the primary filter path.

2. The filtering apparatus of claim 1 wherein said rigid porous filtering means is a cylindrical, hollow filtering means.

3. The filtering apparatus of claim 2 wherein said filter path is formed by a helical projection on the interior surface of said filter body extending inwardly to contact the outer surface of the cylindrical filtering means and said non-rigid expanding means is positioned within and along the length of the cylindrical filtering means.

4. The filtering apparatus of claim 2 wherein said non-rigid expanding means comprises annular ridges on the surface adjacent said porous, rigid filtering means.

5. The filtering apparatus of claim 3 further comprising a cylindrical, hollow structure forming a series of discrete annular projections between said cylindrical filtering means and said non-rigid expanding means.

6. The filtering apparatus of claim 2 wherein the non-rigid expanding means surrounds the outside of the porous, rigid filtering means.

7. The filtering apparatus of claim 6 further comprising rigid guide means positioned inside said porous, rigid filtering means, said rigid guide means forming the primary filter path along the interior surface of said filtering means.

8. The filtering apparatus of claim 7 wherein said rigid guide means forms a helical flow path along the interior surface of said filtering means.

9. The filtering apparatus of claim 7 wherein said rigid guide means is tapered to form a flow path with a variable cross-sectional area along the interior surface of said filtering means.

10. The filtering apparatus of claim 6 wherein said non-rigid expanding means further comprises discrete annular projections on the surface adjacent said porous, rigid filtering means.

11. The filtering apparatus of claim 6 further comprising a hollow cylindrical structure for forming discrete annular compartments between said non-rigid expanding means and said porous rigid filtering means.

12. The filtering apparatus of claim 6 wherein said porous rigid filtering means further comprises a helical annular projection along the interior surface of said filtering means.

* * * * *